US008135834B1

(12) United States Patent
Jacobson et al.

(10) Patent No.: US 8,135,834 B1
(45) Date of Patent: Mar. 13, 2012

(54) METHOD AND SYSTEM FOR CAUSING INTRA-AS NETWORK TRAFFIC TO BE MORE EVENLY BALANCED

(75) Inventors: Van Jacobson, Woodside, CA (US); Haobo Yu, San Jose, CA (US); Cengiz Alaettinoglu, Los Angeles, CA (US)

(73) Assignee: Packet Design, Inc., Santa Clara, CA (US)

( * ) Notice: Subject to any disclaimer, the term of this patent is extended or adjusted under 35 U.S.C. 154(b) by 2755 days.

(21) Appl. No.: 10/174,262

(22) Filed: Jun. 18, 2002

Related U.S. Application Data

(60) Provisional application No. 60/299,382, filed on Jun. 18, 2001.

(51) Int. Cl.
*G06F 15/173* (2006.01)
(52) U.S. Cl. ............................................. 709/226
(58) Field of Classification Search .................. 709/226, 709/235
See application file for complete search history.

(56) References Cited

U.S. PATENT DOCUMENTS

| | | | | | |
|---|---|---|---|---|---|
| 5,841,775 | A | * | 11/1998 | Huang | 370/422 |
| 6,108,703 | A | * | 8/2000 | Leighton et al. | 709/226 |
| 6,339,595 | B1 | * | 1/2002 | Rekhter et al. | 370/392 |
| 6,725,253 | B1 | * | 4/2004 | Okano et al. | 709/203 |
| 6,785,704 | B1 | * | 8/2004 | McCanne | 718/105 |
| 6,914,886 | B2 | * | 7/2005 | Peles et al. | 370/254 |
| 6,963,575 | B1 | * | 11/2005 | Sistanizadeh et al. | 370/404 |
| 6,973,057 | B1 | * | 12/2005 | Forslöw | 370/328 |
| 6,999,454 | B1 | * | 2/2006 | Crump | 370/389 |
| 7,028,083 | B2 | * | 4/2006 | Levine et al. | 709/223 |
| 2002/0021675 | A1 | * | 2/2002 | Feldmann | 370/254 |
| 2002/0172148 | A1 | * | 11/2002 | Kim et al. | 370/216 |
| 2003/0154279 | A1 | * | 8/2003 | Aziz | 709/225 |
| 2005/0198250 | A1 | * | 9/2005 | Wang | 709/223 |
| 2005/0201302 | A1 | * | 9/2005 | Gaddis et al. | 370/254 |

OTHER PUBLICATIONS

RFC 1163—A Border Gateway Protocol; (Lougheed et al.) Network Working Group, Jun. 1990.*
RFC1164—Application of the Border Gateway Protocol in the Internet; (Honig et al.) Network Working Group, Jun. 1990.*
RFC 1371—Choosing a "Common IGP" for the IP Internet; (P. Gross) Network Working Group, Oct. 1992.*
RFC 1745—BGP4/IDRP for IP—OSPF Interaction; (Varadhan et al.) Network Working Group, Dec. 1994.*
RFC 1863—A BGP/IDRP Route Server alternative to a full mesh routing; (D. Haskin) Network Working Group, Oct. 1995.*
RFC 1966—BGP Route Reflection—An alternative to full mesh IBGP; (Bates et al.) Network Working Group, Jun. 1996.*
Fortz. Bernard and Mikkel Thorup, "Internet Traffic Engineering by Optimizing OSPF Weights", IEEE Infocom, 2000.
Feldman, Anja et al, "NetScope: Traffic Engineering for IP Networks", IEEE Network, 2000.
Wang, Yufei and Zheng Wang, "Explicit Routing Algorithms for Internet Traffic Engineering", ICCCN 1999.
Vutukury, Srinivas and J.J. Garcia-Luna-Aceves, "A Simple Approximation to Minimum-Delay Routing", SIGCOMM, 1999.
Kodialam, Murali and T.V. Lakshman, "Minimum-Interference Routing with Applications to MPLS Traffic Engineering", IEEE Infocom, 2000.
Kodialam, Murali and T.V. Lakshman, "Dynamic Routing of Bandwidth Guaranteed Tunnels with Restoration", IEEE Infocom. 2000.

* cited by examiner

*Primary Examiner* — Christopher Biagini
(74) *Attorney, Agent, or Firm* — Innovation Partners; Charles E. Gotlieb

(57) ABSTRACT

A system and method enables the balancing of inter-AS traffic from a primary AS to a target AS by adding a virtual node in the primary AS that appears connected to the edge routers that advertise via (I)BGP the ability to forward communications the target AS, and modifying the (I)BGP messages reflected to the primary AS to indicate that only the virtual node may forward communications to the target AS.

21 Claims, 4 Drawing Sheets

METHOD AND SYSTEM FOR CAUSING INTRA-AS NETWORK TRAFFIC TO BE MORE EVENLY BALANCED

RELATED APPLICATION

This application claims the benefit of U.S. provisional patent application Ser. No. 60/299,382 entitled "Method and Apparatus for Balancing Intra-AS Network Traffic Within an AS filed on Jun. 18, 2001 by Van Jacobson, Haobo Yu and Cengiz Alaettinoglu and is hereby incorporated by reference in its entirety.

FIELD OF THE INVENTION

The present invention is related to computer software and more specifically to computer networking software.

BACKGROUND OF THE INVENTION

Conventional networks such as the Internet are made of interconnected autonomous systems (AS). An autonomous system is a network under administrative control of a single entity, such as the network of a conventional Internet Service Provider (ISP). When coupled to other autonomous systems, each autonomous system becomes a portion of a larger network.

Each autonomous system is made up of communication equipment, including conventional routers. Routers that communicate between autonomous systems are described herein as edge routers (also known as border routers), and routers that communicate within an AS are referred to as internal routers.

Some of the internal routers in a conventional autonomous system are coupled to internal networks of one or more computer systems that are typically not under the control of the same entity that administers the AS, even though the internal network is said to be an internal network of that AS. For example, a customer of an AS may operate an internal network of that AS.

Routers in each AS can communicate topology and routing information via several protocols, including Interior Gateway Protocols (IGP) such as ISIS and OSPF and the conventional Internal Border Gateway Protocol ((I)BGP). IGP is used internal to the AS to provide topology information. Each router identifies itself as a node in the network and broadcasts information about the internal networks to which it is directly connected, as well as information about other routers to which it is directly connected, among other information. To compactly describe a large number of addresses, a range (i.e. a block) of addresses of each internal network may be communicated in the form of a prefix and a mask. An address of an internal network is within the range if the address of the internal network ANDed with the mask is equal to the prefix. Each router in an AS listens to this information and builds a complete topology map of the AS, including cost metrics for each link that are frequently inversely proportional to the bandwidth of the link, to allow the router to select the least cost route to any destination in the network. If a router receives a communication having an intended destination that is an address of an internal network of the AS, the router is able to forward the communication to the router directly connected to it that is on the least cost route to the intended destination specified in the communication. A router is directly connected to another router if communication between those two routers is not required to pass through another router. If there is more than one path possible to reach a particular destination, the manner in which the least cost path is selected can serve to allocate the traffic among the various paths to balance the utilization of all available paths according to the capacity of the path.

Information about inter-AS communications is communicated between autonomous systems via BGP and the BGP information is communicated within an AS using (I)BGP. BGP allows routers at the edge of each AS to describe to the edge router of another AS to which it is connected, all of the blocks of addresses with which it may communicate and the costs of doing so, using the prefix and mask technique described above. The BGP information received by each edge router of an AS is provided to all of the routers in the AS as (I)BGP information. This allows the routers in the AS to route communications intended for other autonomous systems to edge routers that can transmit the communication. Edge routers in an AS that receive this information via BGP as described above transmit it using (I)BGP messages to the other edge routers in the AS and/or to specialized devices known as route reflectors. If route reflectors are not used, certain of the edge routers are designated as BGP speakers to transmit the BGP information (in the form of (I)BGP messages) to the non-edge routers in the AS. Thus, either the BGP speakers or route reflectors take the (I)BGP messages from the edge routers and provide BGP information via (I)BGP messages to the internal routers in the AS.

When a device receives a communication that is to be forwarded to another AS, the device forwards the communication to the directly connected router in the least cost path that includes one of the edge routers that advertised itself via (I)BGP as being able to forward communications to that AS. As described above, the routing algorithms that select the least cost path can cause the traffic in an AS to utilize each link in the AS somewhat uniformly, so that for example, every link is utilized at approximately 40% of capacity.

However, there is a problem with this approach. If a communication is received for a destination, an edge router will prefer the path to another AS that communicates with that destination over an intra AS path that may support the same destination. Because the least cost paths are identified by the routers in an AS before the BGP information is added (the BGP information is added to the IGP information after the paths are calculated) if multiple edge routers communicate between a pair of autonomous systems, the utilization of the inter-AS links may not be balanced by the routing algorithms in the same manner that such utilization is balanced within the links of the AS.

It would be expensive to replace the routers in any autonomous system in order to solve these problems. Thus, it can be desirable that any solution to these problems be compatible with conventional routers.

What is needed is a method and system that can balance traffic among several paths between two autonomous systems in a manner that is compatible with existing router protocols.

SUMMARY OF INVENTION

A system and method in one AS, referred to as the "primary AS", receives ranges of addresses served by another AS to which it is coupled, the other AS being referred to as a "target AS". The system and method alters the information in the primary AS to appear to have a topology and connectivity with a target AS, that is different from the actual topology of the AS and its connectivity with the target AS. To alter the topology information, a "virtual node" is created by providing IGP information about a device that does not actually exist in the network. The IGP information about the virtual node is provided to make the virtual node appear to be connected to all of the edge routers in the primary AS that advertise themselves via (I)BGP information as being able to reach the target AS. To alter the connectivity information, each of a one or more selected range of addresses that are internal networks to the target AS are disassociated from the edge routers in the primary AS and not communicated to the internal routers of the primary AS. Instead, BGP information is communicated via (I)BGP to the non-edge routers in the AS to make it appear that the selected ranges of addresses are served by the virtual node.

When routes are calculated, traffic will be balanced among the edge routers serving the selected range of addresses in an attempt to balance traffic between the links to the virtual node. Although the virtual node will be a part of the routing information for the routers in the AS, including the edge, routers, when traffic for the target AS arrives at one of the edge routers that can forward to that AS, the edge router will forward the traffic to the inter-AS link, ignoring the virtual node, because of the preference for the inter AS path held by conventional edge routers.

DETAILED DESCRIPTION OF A PREFERRED EMBODIMENT

Figure 1:
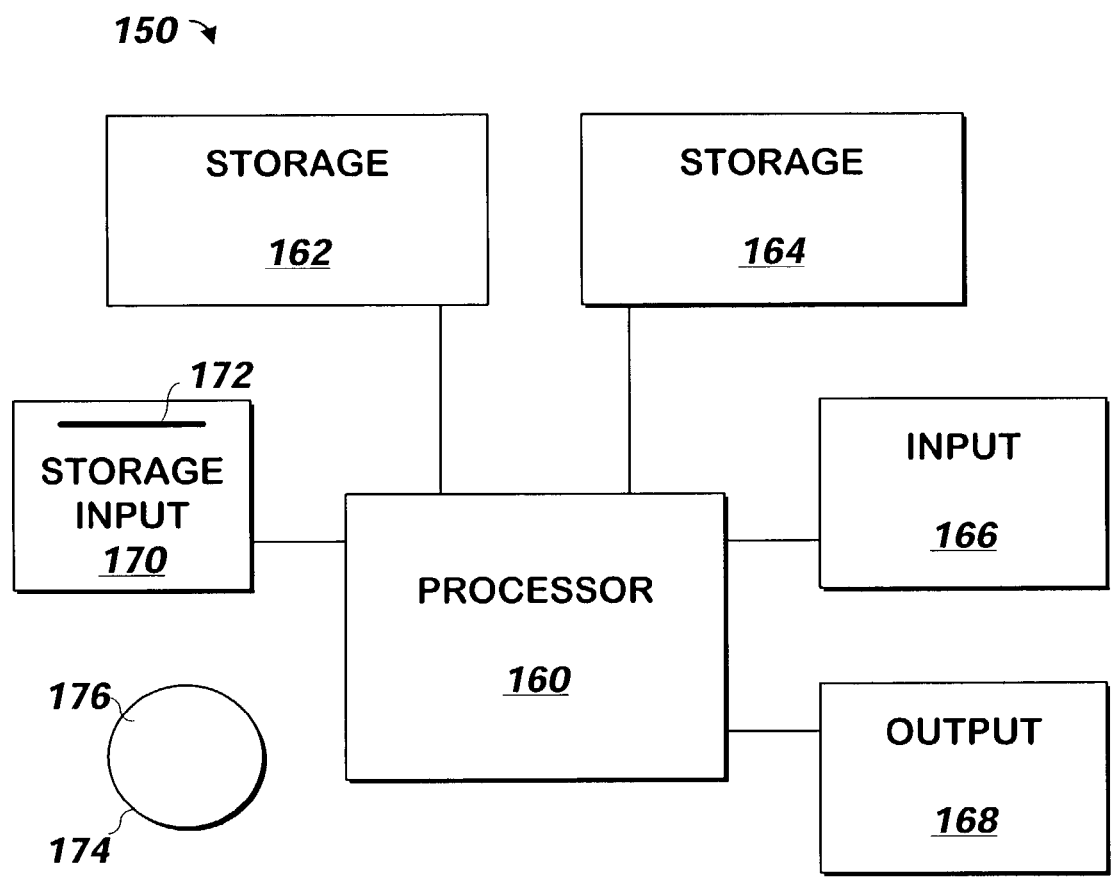
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Palo Alto, Calif., a Pentium-compatible personal computer system such as are available from Dell Computer Corporation of Round Rock, Tex. running the Windows (95, 98 or NT) operating system commercially available from Microsoft Corporation of Redmond Wash. or FreeBSD operating system or a Macintosh computer system running the MacOS commercially available from Apple Computer Corporation of Cupertino, Calif. and the Netscape browser commercially available from Netscape Computer Corporation of Mountain View, Calif. although other systems may be used.

Figure 2:
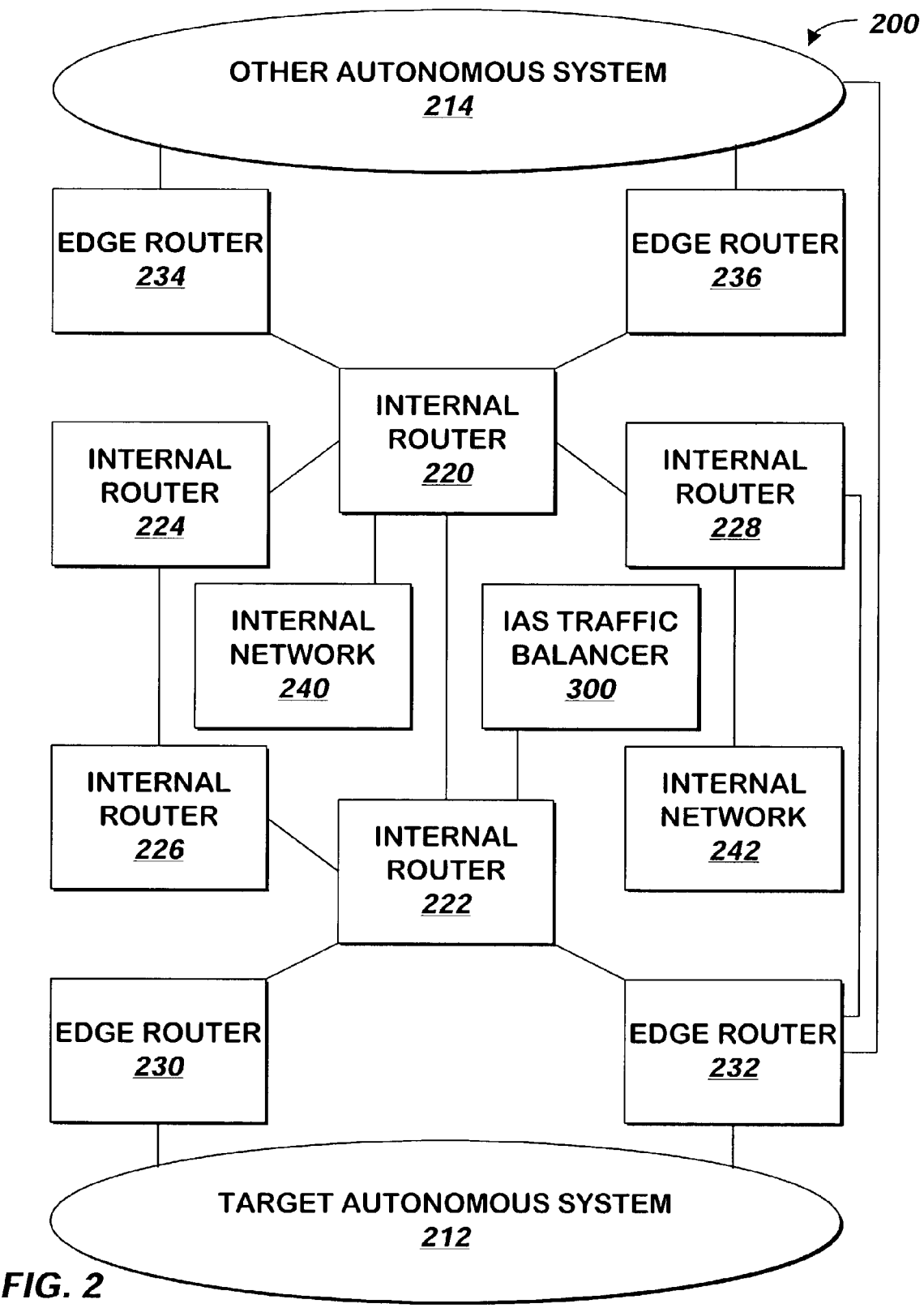
FIG. 2 is a block schematic diagram of a network according to one embodiment of the present invention.

Referring now to FIG. 2, a network 200 is shown according to one embodiment of the present invention. There are three autonomous systems and two internal networks shown in the Figure. Target autonomous system 212, other autonomous system 214 are illustrated as single entities, although they would be made up of conventional edge routers and conventional internal routers in a manner similar to the primary autonomous system, described in more detail below.

Elements 220-238 are included as part of the primary autonomous system and are conventional edge routers and internal routers (each being conventional routers, either coupled to a different AS or not coupled to another AS, respectively), and need not contain any non-conventional capabilities for balancing inter-AS traffic. The primary autonomous system is the autonomous system from which traffic to the target autonomous system 212 is balanced as described herein.

The primary autonomous system contains inter-autonomous system traffic balancer 300 described in more detail below, conventional edge routers 230-236, through which all inter-AS traffic flows and internal routers 220-228. Internal routers 220-228 are non-edge routers through which certain intra-AS traffic flows. Coupled to certain internal routers 220, 228 are internal networks 240, 242 which are networks operated by or for customers of the AS. Internal networks of an AS are coupled to the network 200 by direct AS connection to a router of that AS. Direct AS connection means connection that does not pass through another AS. Although internal networks have a direct AS connection, communications from that internal network may be provided to any AS 212, 214 on the network 200.

The network 200 of FIG. 2 is merely representative of a conventional network made up of multiple interconnected autonomous systems, and should not be seen as limiting the present invention in any manner. Any number of autonomous systems, routers, internal networks and inter-autonomous system traffic balancers may be used according to the present invention.

Figure 3:
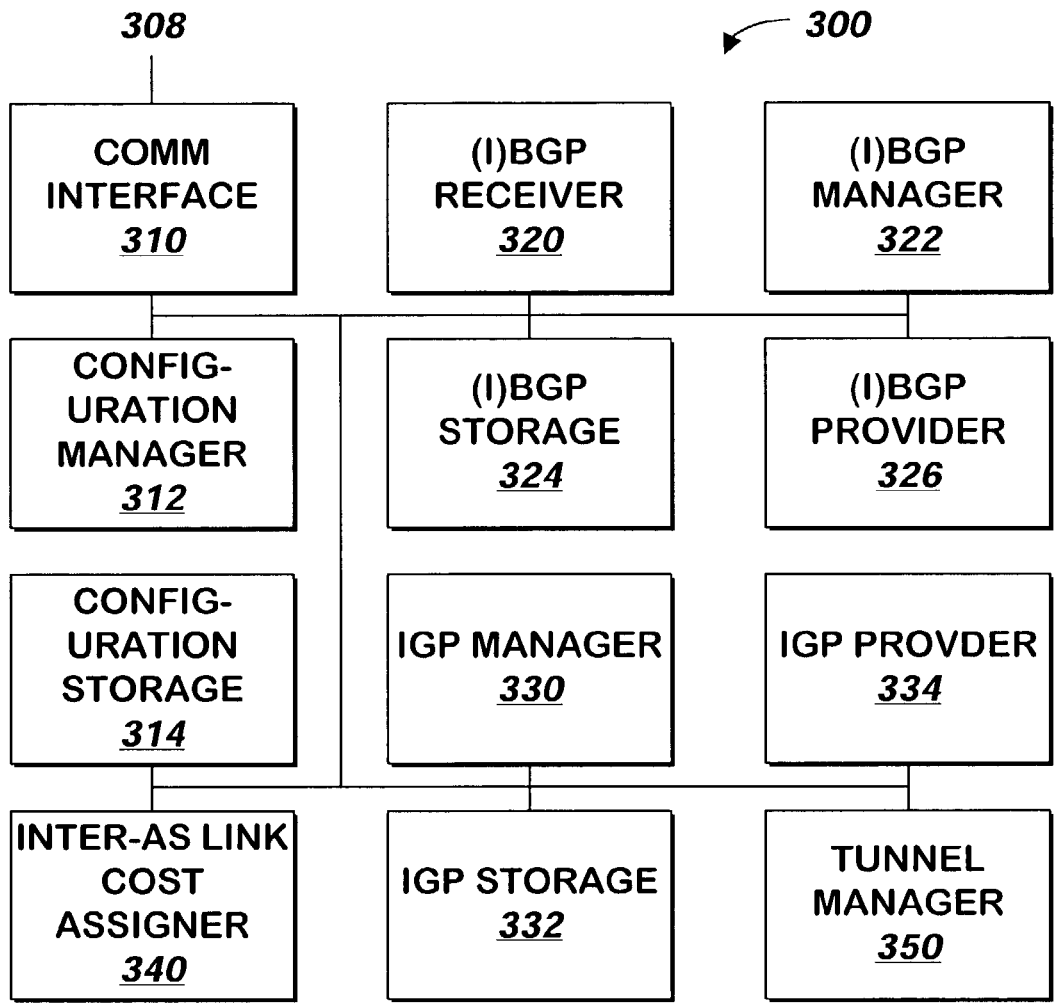
FIG. 3 is a block schematic diagram of an inter-autonomous system traffic balancer 300 of FIG. 2 according to one embodiment of the present invention.

FIG. 3 illustrates inter-autonomous system traffic balancer 300 in more detail. Referring now to FIGS. 2 and 3, suitably configured edge routers 230-236 receive BGP information via BGP messages received from edge routers in the target AS 212 and other AS 214 and provide BGP information in the form of (I)BGP messages to inter-autonomous system traffic balancer 300 as if inter-autonomous system traffic balancer 300 is a conventional route reflector. Those (I)BGP messages are received by input/output 308 of communication interface 310, suitably configured as a BGP peer with the edge routers 230-238 to allow communication interface 310 to receive (I)BGP messages from such edge routers 230-238.

Communication interface 310 is a conventional TCP/IP-compatible communication interface and handles all of the communication into and out of system 300. Communication interface 310 provides such (I)BGP messages to (I)BGP receiver 320, which stores the messages in a working area of (I)BGP storage 324.

Prior to operating inter-autonomous system traffic balancer 300 in order to arrange the balancing of inter-AS traffic as described below, a system administrator configures inter-autonomous system traffic balancer 300 by connecting to communication interface 310 on a port dedicated to configuration of inter-autonomous system traffic balancer 300. Communication interface forwards such communications to configuration manager 312, which provides a user interface back to the requesting user via communication interface 310.

The system administrator provides indications of the destination IP addresses for which balancing is desired. In one embodiment, the indications of the destinations addresses include blocks of addresses, specified by such methods as via a prefix and mask. In another embodiment, the indications include an individual address, and any block described in the BGP information received as described above that contains any of the specified addresses is considered to be included as an address for which balancing is desired. In one embodiment, indications of all of the addresses of internal networks of the target AS 212 are received from the system administrator as indications of the traffic to be balanced, although in another embodiment, only one such indication or any other number of indications are provided by the system administrator. The indications may encompass less than, or more than, all of the internal networks of a single AS in other embodiments of the present invention. Configuration manager 312 stores the indications in configuration storage 314.

The system administrator may signal inter-autonomous system traffic balancer 300 using a user interface provided by configuration manager 312 to arrange the balancing of inter-AS traffic having a destination address that corresponds to the indications in configuration storage 314. When so signaled, configuration manager 312 signals IGP manager 330.

IGP manager 330 scans the working area of (I)BGP storage 324 and identifies the IP addresses of the edge routers that can reach any of the destination addresses corresponding to the indications in configuration storage 314. In the Figure, because edge routers 230, 232 will advertise via (I)BGP that they can reach the addresses in the target AS 212, and because the indications of the addresses of the internal networks in configuration storage 314 correspond to all of the internal networks of the target AS 212, IGP manager 330 will identify the IP addresses of those routers 230, 232 or interfaces of those routers 230, 232 that can reach the destination addresses corresponding to the indications. Thus for purposes of example, edge routers 230, 232 are so marked.

IGP manager marks such IP addresses of such routers or interfaces in the working area of (I)BGP storage 324 and signals inter-AS link cost assigner 340.

Inter-AS link cost assigner 340 assigns a link cost for each link between the edge routers 230, 232 (or interfaces thereof) marked as described above, and the edge routers in the target AS 212 or other AS 214 to which they are directly connected (although not used in the examples described herein, it is possible that an edge router having no direct connection to any edge router in a target AS may nevertheless advertise itself via (I)BGP as being able to forward communications to the target AS 212). In one embodiment, the link costs are received from the system administrator via a user interface provided by inter-AS link cost assigner 340 via communication interface 310, and in another embodiment, inter-AS link cost assigner 340 assigns a link cost to each such link by logging into each router or interface marked in the working area of (I)BGP storage 324 as described above, and, using SNMP, retrieving the bandwidth of the outgoing link to the target AS 212 or other AS 214 and assigning a link cost to that link that is a function of the inverse of the bandwidth. In one embodiment, the link cost is assigned by inter-AS link cost assigner 340 from the bandwidth of the link using a formula provided by the system administrator to configuration manager 312 and stored in configuration storage 314.

Inter-AS link cost assigner 340 stores in (I)BGP storage 324 the cost of each link it assigns as described above associated with the IP address of the router or interface to which the cost was assigned. When inter-AS link cost assigner 340 completes assigning a cost to each marked link, inter-AS link cost assigner signals tunnel manager 350.

In one embodiment, between inter-autonomous system traffic balancer 300 and each edge router marked in (I)BGP storage 324, either a direct connection, or a tunnel, is established. A direct connection is a connection that does not pass through any other router 220-238 in the AS. In one embodiment, if a direct connection exists to any edge router, the system administrator enters to configuration manager 312 the IP address of the router or interface to which the direct connection is made, and configuration manager 312 stores such address in configuration storage 314. Tunnel manager 350 compares the IP addresses marked as described above in the working area of (I)BGP storage 324 and for each marked IP address to which inter-autonomous system traffic balancer 300 does not have a direct connection, tunnel manager 350 sets up a tunnel with the router or interface at that address using conventional tunneling protocols (such as IPSec) and techniques. If necessary, a system administrator suitably configures any edge router 230-238 to allow such tunnels to be set up. All IGP communications with those edge routers 230, 232 not only passes through communication interface 310, but also passes through tunnel manager 350 which performs conventional encryption and decryption and other tunneling techniques. Because of the direct connection or tunnel, the edge routers 230, 232 with which tunnels have been established will advertise a connection to inter-autonomous system traffic balancer 300 via conventional IGP messages, as if inter-autonomous system traffic balancer 300 were a conventional router directly connected to each such edge router 230, 232.

When tunnel manager 350 has completed setting up tunnels with each marked edge router 230, 232 or interface in such edge router 230, 232, tunnel manager 350 signals IGP manager 330.

IGP manager 330 retrieves the IP addresses of the marked routers or interfaces from the working area of (I)BGP storage 324 and builds a set of IGP messages using a conventional IGP protocol that identifies the virtual node as a node corresponding to a router on the network directly connected to each of the edge routers 230, 232 or interfaces thereof marked in the working area of (I)BGP storage 324 and stores such messages in IGP storage 332. The IP address of the virtual node may be an unroutable IP address provided by the system administrator to configuration manager 312, which stores it in configuration storage 314 for retrieval by IGP manager 330. In one embodiment, the IP address of the virtual node is the IP address of inter-autonomous system traffic balancer 300. The link cost assigned between the virtual node and the marked router or interface is the link cost assigned to that router or interface by inter-AS link cost assigner 340 and stored, in the working area (I)BGP storage 324 as described above, which IGP manager 330 retrieves and includes in the IGP messages it builds. When IGP manager 330 has completed building this set of IGP messages, IGP manager 330 signals (I)BGP manager 322 and signals IGP provider 334. When so signaled, IGP provider 334 provides the messages from IGP storage 332 via communication interface 310, and periodically repeats the messages or provides updates according to the IGP protocol used.

When signaled by IGP manager 330, (I) BGP manager 322 creates in an outgoing area of (I)BGP storage 324 a modified copy of the information in the working area of (I)BGP storage and adds BGP information about the virtual node to the outgoing area of (I)BGP storage 324.

To modify the information in (I)BGP storage 324, (I)BGP manager 322 copies into an outgoing area of (I)BGP storage 324 the BGP information in the working area of (I)BGP storage 324. As it copies the information, (I) BGP manager 322 removes from the information stored in (I)BGP storage 324 the association between the marked edge routers 230, 232 or interfaces thereof and the blocks of addresses corresponding to the indications stored in configuration storage 314. Thus, marked routers 230, 232 or interfaces will not be identified in the BGP information in the outgoing area of (I)BGP storage 324 as being able to forward communications to any of the internal networks of the target AS 212 even though they remain capable of doing so. All other blocks of addresses to which any of the edge routers 230-236 are capable of forwarding communications will be copied to the outgoing area of (I)BGP storage 324 by (I)BGP manager 322 and therefore those blocks of addresses remain associated with the routers advertised via (I)BGP that they could forward communications to such addresses.

In addition to the activities described above, (I) BGP manager 322 adds the IP address of the virtual node to the outgoing area of (I)BGP storage 324 and associates any of the blocks of addresses disassociated from edge routers 230, 232 to the IP address of the virtual node in the outgoing area as BGP information. The association makes the BGP information in the communication area of (I)BGP storage 324 appear as if the virtual node is capable of forwarding communications to any of the internal networks in the target AS. Because of the disassociation described above, the virtual node will appear to be the only node that can forward such communications.

When (I)BGP manager 322 has completed disassociating the blocks of addresses from edge routers 230, 232 of the target AS 212, and associating those blocks of addresses with the virtual node as described above, (I) BGP manager 322 signals (I)BGP provider 326.

When signaled by (I)BGP manager 322, (I) BGP provider 326 provides the information from the communication area in (I)BGP storage 324 as (I)BGP messages in the manner of a conventional route reflector to other routers in the AS. The other routers may be some or all of the routers in the primary AS. If only some of the routers receive such messages, only traffic that is forwarded by such routers will be more evenly balanced as described herein.

The result is that the primary AS 212 appears to internal routers 220, 222 to have only one edge router capable of forwarding messages to the target AS: the virtual node. Although the non-edge routers are unaware of the fact that edge routers 230, 232 can actually reach the target AS 212, because of the IGP information provided as described above, edge routers 230, 232 will be on any path to the virtual node. When they receive communications intended for the target AS 212, they will prefer the path to the edge router of the target AS 212 to that of the virtual node, so no communications will actually be directed to the virtual node. Because conventional routing algorithms cause the links from the primary AS to the target AS to be considered in balancing traffic, utilization on those links may be more evenly distributed than may otherwise occur.

Figure 4:
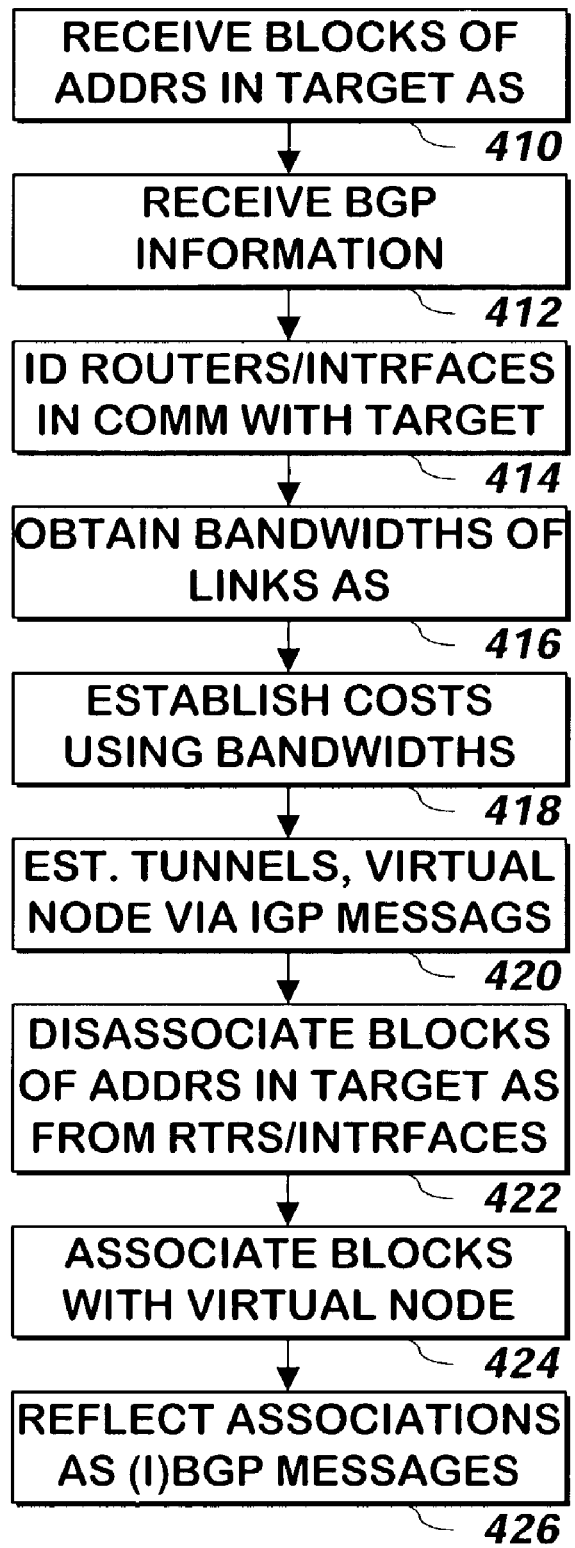
FIG. 4 is a flowchart illustrating a method of allowing the balancing of the utilization of intra-AS links according to one embodiment of the present invention.

Referring now to FIG. 4, a method of allowing the balancing the utilization of inter-AS links is shown according to one embodiment of the present invention. Indications of blocks of addresses in the target AS are received 410 as described above. BGP information is received 412 via (I)BGP messages as described above. Edge routers or interfaces thereof in the primary AS capable of forwarding communications to the target AS are identified 414 and the link bandwidths between each such router or interface in the primary AS and the AS to which it is directly connected are identified 416 as described above.

Link costs are established as described above, for example, by using the bandwidths identified in step 416, with the link cost for each link from the router or interface to the target AS having a cost inversely proportional to the bandwidth of the link from that router or interface to the target AS. A virtual node is established 420 with a link to every router or interface identified in step 414 using as link costs from a router or interface to the virtual node the costs corresponding to the link from that router or interface to the directly connected AS as identified in step 418. Step 420 may involve establishing tunnels between a device performing the method of FIG. 4 and the edge routers identified in step 414 as described above.

The blocks of addresses corresponding to the indications received in step 410 are disassociated 422 from the edge routers as described above and associated 424 with the virtual node and BGP information modified as described in step 422 and 424 for the primary AS is reflected 426 to routers in the primary AS as described above.

What is claimed is:

1. A method of providing information to a first portion of a network, the method comprising:

receiving a first set of information from a plurality of routers at the edge of the first portion of the network, the first set of information comprising, for each of such plurality of routers at the edge of the first portion of the network, a plurality of ranges of addresses associated with said plurality of routers at the edge of the first portion of the network; and providing, to a plurality of routers not on the edge of the first portion of the network, information regarding a virtual node that does not physically exist on the network, the information regarding the virtual node comprising an address and connectivity information identifying said virtual node as being coupled to a plurality of the plurality of routers at the edge of the first portion of the network and associated with a designated at least one of the plurality of ranges of addresses.

2. A system for providing information to a first portion of a network, the system comprising:

a receiver having an input for receiving a first set of information from a plurality of routers at the edge of the first portion of the network, the first set of information comprising, for each of such plurality of routers at the edge of the first portion of the network, a plurality of ranges of addresses associated with said plurality of routers at the edge of the first portion of the network, the receiver for providing at least a portion of the information at an output; and at least one provider having an input coupled to the receiver output for receiving at least a first portion of the portion of information, the first provider for providing at an output, to a plurality of routers not on the edge of the first portion of the network, information regarding a virtual node that does not physically exist on the network, the information regarding the virtual node comprising an address and connectivity information identifying said virtual node as being coupled to a plurality of the plurality of routers at the edge of the first portion of the network and associated with a designated at least one of the plurality of ranges of addresses.

3. A computer program product comprising a computer useable medium having computer readable program code embodied therein for providing information to a first portion of a network, the computer program product comprising computer readable program code devices configured to cause a computer to:

receive a first set of information from a plurality of routers at the edge of the first portion of the network, the first set of information comprising, for each of such plurality of routers at the edge of the first portion of the network, a plurality of ranges of addresses associated with said plurality of routers at the edge of the first portion of the network; and provide, to a plurality of routers not on the edge of the first portion of the network, information regarding a virtual node that does not physically exist on the network, the information regarding the virtual node comprising an address and connectivity information identifying said virtual node as being coupled to a plurality of the plurality of routers at the edge of the first portion of the network and associated with a designated at least one of the plurality of ranges of addresses.

4. The computer program product of claim 3, wherein the first set of information comprises Internal Border Gateway Protocol ((I)BGP) information.

5. The computer program product of claim 3 wherein the first portion of the network comprises an autonomous system.

6. The computer program product of claim 3 wherein the information regarding the virtual node is provided using an interior gateway protocol (IGP).

7. The computer program product of claim 3, wherein the plurality of ranges of addresses associated with said router at the edge of the first portion of the network comprise a plurality of ranges of addresses reachable by said router at the edge of the first portion of the network.

8. The computer program product of claim 3 additionally comprising computer readable program code devices configured to cause the computer to:

remove at least one of the plurality of ranges of addresses from at least a portion of the first set of information corresponding to each of at least one of the plurality of routers at the edge of the first portion of the network to produce a modified first set of information; and provide the modified first set of information to the plurality of routers not on the edge of the first portion of the network.

9. The computer program product of claim 8 wherein the computer readable program code devices configured to cause the computer to remove are performed for all of the plurality of routers at the edge of the first portion of the network associated with the designated at least one of the plurality of ranges of addresses.

10. The method of claim 1, wherein the first set of information comprises Internal Border Gateway Protocol ((I)BGP) information.

11. The method of claim 1 wherein the first portion of the network comprises an autonomous system.

12. The method of claim 1 wherein the information regarding the virtual node is provided using an interior gateway protocol (IGP).

13. The method of claim 1, wherein the plurality of ranges of addresses associated with said router at the edge of the first portion of the network comprise a plurality of ranges of addresses reachable by said router at the edge of the first portion of the network.

14. The method of claim 1 additionally comprising:

removing at least one of the plurality of ranges of addresses from at least a portion of the first set of information corresponding to each of at least one of the plurality of routers at the edge of the first portion of the network to produce a modified first set of information; and providing the modified first set of information to the plurality of routers not on the edge of the first portion of the network.

15. The method of claim 14 wherein the removing step is performed for all of the plurality of routers at the edge of the first portion of the network associated with the designated at least one of the plurality of ranges of addresses.

16. The system of claim 2, wherein the first set of information comprises Internal Border Gateway Protocol ((I)BGP) information.

17. The system of claim 2 wherein the first portion of the network comprises an autonomous system.

18. The system of claim 2 wherein the information regarding the virtual node is provided by the provider using at least an interior gateway protocol (IGP).

19. The system of claim 2, wherein the plurality of ranges of addresses associated with said router at the edge of the first portion of the network comprise a plurality of ranges of addresses reachable by said router at the edge of the first portion of the network.

20. The system of claim 2 additionally comprising:

a manager having an input for receiving at least a first portion of the portion of information, the manager for removing at least one of the plurality of ranges of addresses from at least a portion of the first set of information corresponding to each of at least one of the plurality of routers at the edge of the first portion of the network to produce a modified first set of information, and for providing the modified first set of information at an output; and wherein the at least one provider additionally has an input coupled to the manager output for receiving at least a portion of the modified set of information, the at least one provider additionally for providing the modified first set of information to the plurality of routers not on the edge of the first portion of the network.

21. The system of claim 20 wherein the manager removes the selected at least one of the plurality of addresses from the at least a portion of the first set of information corresponding to all of at least one of the plurality of routers at the edge of the first portion of the network associated with the designated at least one of the plurality of ranges of addresses.

* * * * *